United States Patent [19]

Sivertson, Jr.

[11] 4,019,179
[45] Apr. 19, 1977

[54] METHOD OF LOCATING PERSONS IN DISTRESS

[75] Inventor: Wilford Eugene Sivertson, Jr., Yorktown, Va.

[73] Assignee: The United States of America as represented by the Administrator of the National Aeronautics and Space Administration, Washington, D.C.

[22] Filed: Feb. 27, 1976

[21] Appl. No.: 662,176

[52] U.S. Cl. .................. 343/5 MM; 340/5 H; 343/5 CM; 343/18 B
[51] Int. Cl.² ............ G01S 7/04; G01S 9/02
[58] Field of Search ........ 343/5 MM, 5 PC, 5 SA, 343/5 CM, 18 B; 340/5 H

[56] References Cited

UNITED STATES PATENTS

| | | | |
|---|---|---|---|
| 2,463,474 | 3/1949 | Busignies | 343/18 B |
| 3,457,013 | 7/1969 | Henf | 343/5 MM |
| 3,483,513 | 12/1969 | Burckhardt et al. | 340/5 H |

Primary Examiner—Maynard R. Wilbur
Assistant Examiner—Richard E. Berger
Attorney, Agent, or Firm—Howard J. Osborn; William H. King; John R. Manning

[57] ABSTRACT

A method for locating any person in distress in a selected area on the surface of the earth who has deployed passive radio frequency (RF) reflectors in a predetermined arrangement. A first transparency is made in the spatial frequency domain of an image of said predetermined arrangement of said RF reflectors. The said selected area of the surface of the earth is scanned by means of a side-looking radar, on board a satellite or aircraft, to produce radar images. Second transparencies in the conventional image domain are produced from the radar images. It is then determined from the first and second transparencies, by means of complex spatial filtering, if RF reflectors in said predetermined arrangement were deployed in said selected area when scanned by said radar.

4 Claims, 3 Drawing Figures

METHOD OF LOCATING PERSONS IN DISTRESS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to search and rescue operations and more specifically concerns the detection of a distress signal within the field-of-view of a radar being used in a search and rescue operation.

Current search and rescue techniques are inadequate in three areas: they do not provide timely detection of an emergency; they do not adequately locate a distress site; and they do not sufficiently assess the emergency site environment so that a rescue mission can be adequately planned.

A number of other search concepts and systems have been proposed. Those receiving the most attention are the use of emergency locator transmitters and the use of the Omega navigation system in conjunction with a synchronous relay satellite and ground computing and communication facilities. Both of these systems require the user to employ active receiver and/or transmitter devices after an emergency situation has developed. These and other current proposed schemes require expensive users equipment and must be constantly maintained, calibrated, and tested, and they do not provide for all-weather operations. In addition to these constraints, information relative to the emergency site environment and avenues of ingress and egress cannot be supplied by the system for affecting a timely rescue operation.

It is a primary object of this invention to provide timely detection of an emergency in a search and rescue operation.

A further object of this invention is to provide a search and rescue operation in which the avenues of ingress and egress to the location of the distress can be supplied for affecting a timely rescue operation.

Another object of the invention is to provide an effective and reliable means for detecting, identifying and positioning emergency situations involving surface units such as aircraft, ships, small boats and individuals or groups of individuals.

SUMMARY OF THE INVENTION

The invention embodies the use of passive radio frequency (RF) reflectors used in conjunction with an imaging or side-looking radar (synthetic aperture radar systems). In the invention, RF reflectors are carried as standard emergency equipment, by aircraft, ships, small boats, and other terrestrial vehicles and individuals; and they are deployed in a predetermined arrangement in an emergency situation as a distress target to aid in subsequent search and rescue operations. A side-looking radar is carried by a search aircraft or an orbiting vehicle and is used to detect, identify, and position-locate the RF target. In addition, the radar provides the image of the distress site in which the target is located. In this way, surrounding terrain can be analyzed to determine useful ingress and egress routes as an aid to planning a rescue.

The key to the identification technique used in locating a distress is the predetermined arrangement of the deployed RF reflectors. The reflectors are arranged at the distress site and are detected by an overflown imaging radar. After detection by the radar, the image is input to an optical processor where coherent illumination is used to transform the spatial image into its Fourier spectrum and which is then correlated with a spatial frequency filter of the predetermined arrangement of RF reflectors. When a match is achieved, the output from the processor provides a positive identification of the input distress target site. This identification can be automated or it can be manually (visual observation of a correlation spot) determined.

In the optical processor, the detected radar image (containing distress targets imaged with a natural background of the scanned area) is illuminated with coherent collimated light in an image plane. This illumination is provided by a low-power laser, a microscopic lens, a pinhole and a collimating lens. A lens is used to generate a diffraction pattern (Fourier spectrum) of the radar input at a focal plane. A conjugate of the Fourier transform, preprocessed from a known target image, is inserted at this focal point. This conjugate of the Fourier transform is a filter and performs an autocorrelation function for use in identifying a matched target pattern in the input image. The Fourier spectrum of the radar input image is mixed at the focal plane with the filter and a reconstruction lens is used to convert the resulting complex optical signal by a second Fourier transformation to a correlation signal at an output plane. The image produced in the output plane is a correlation spot. When the radar input image is matched to the conjugate filter, the correlation spot is sharply focused and its position within the output plane is a linear function of the position of the distress target within the radar field-of-view. In this way, the search and rescue target is identified and its location is specified.

DETAILED DESCRIPTION OF THE INVENTION

Figure 1:
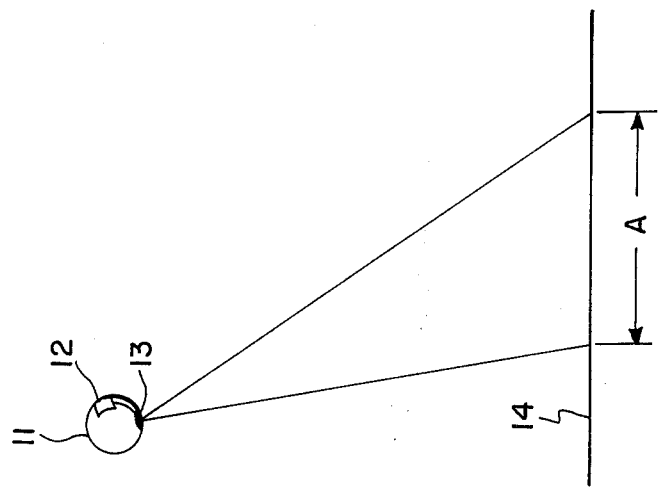
FIG. 1 is a pictorial drawing showing a satellite with a side-looking radar scanning the surface of the earth to pick up the locations of distress sites.

Turning now to the embodiment of the invention selected for illustration in the drawings the number 11 in FIG. 1 indicates a satellite that is used in a search operation. On board the satellite is a side-looking radar 12 that is connected to a side-looking antenna 13. The letter A designates the ground swath of the antenna as the satellite orbits the earth 14. The picture information received by radar 12 is transmitted back to earth by conventional means where radar images are developed from the information. It is then necessary to determine from these developed radar images if someone was within swath A and signalling to be rescued when the satellite was passing overhead.

To determine if someone is signalling to be rescued, there must be some predetermined signal that is to be used by the someone needing help. For the purpose of describing the present invention, it will be assumed that three passive RF reflectors arranged in an L-shaped pattern are used to signal for help. The reflector spacing should be at 2 to 5 times the minimum resolution of radar 12. The reflectors can be any of a number of reflector types. These include rigid, inflatable, and foldable structures consisting of spheres, corner reflectors and luneberg lens and various combinations of spheres, dipoles, and lenses fabricated from solid and grid network materials. The reflectors can be placed at ground level or they can be attached to a tether and allowed to rise above ground level.

Coherent optical data processing with a spatial frequency filter is the basis of the method for detecting distress signals. The spatial frequency filter is a premade transparency on which the image of the predetermined arrangement of the reflectors is stored in the Fourier transform (spatial frequency) domain. Mathematically, a spatial frequency filter is a two-dimensional Fourier transformation of a conventional optical image into the optical information domain of spatial frequencies. Transparencies of the radar images are made and coherent illumination is used to transform the images into a Fourier spectrum which is correlated with the spatial frequency filter. Whenever there is a match, which is indicated by a sharply focused correlation spot in the output plane, a target is located.

Figure 2:
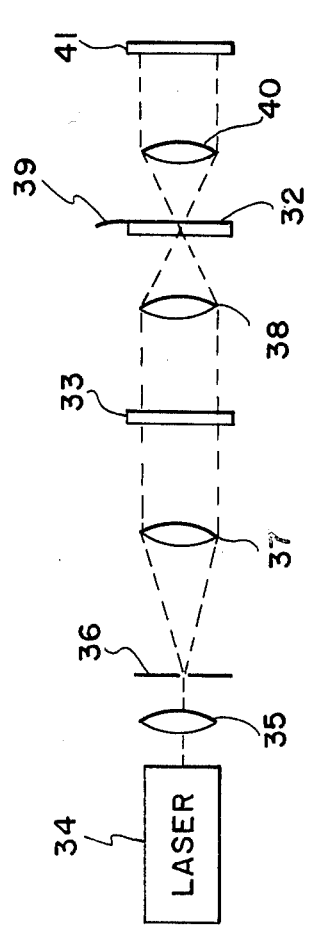
FIG. 2 is a schematic drawing showing how a spatial filter is made of the predetermined arrangement of the passive reflectors.

Referring now to FIG. 2, there is shown a two-beam process for making a spatial filter of the predetermined arrangement of the passive reflectors. The first step in making the spatial filter is to make a transparency 21 in the conventional image domain of the predetermined arrangement of the passive reflectors. Transparency 21 is illuminated with coherent collimated light by means of a laser 22, a lens 23, a pinhole 24, a collimating lens 25, a beam splitter 26, and a mirror 27. A lens 28 generates a Fourier spectrum of the light passed through transparency 21. This spectrum is mixed with a reference beam 29 by means of a mirror 30 and a beam splitter 31 and then deposited on film 32 to form the spatial filter 32. The reference beam of coherent light 29 introduces interference fringes as a means of recording phase information as well as amplitude information. These fringes act as grating-like elements in the filter causing the recognition image to appear as a starlike light off the axis of the optical system.

Figure 3:
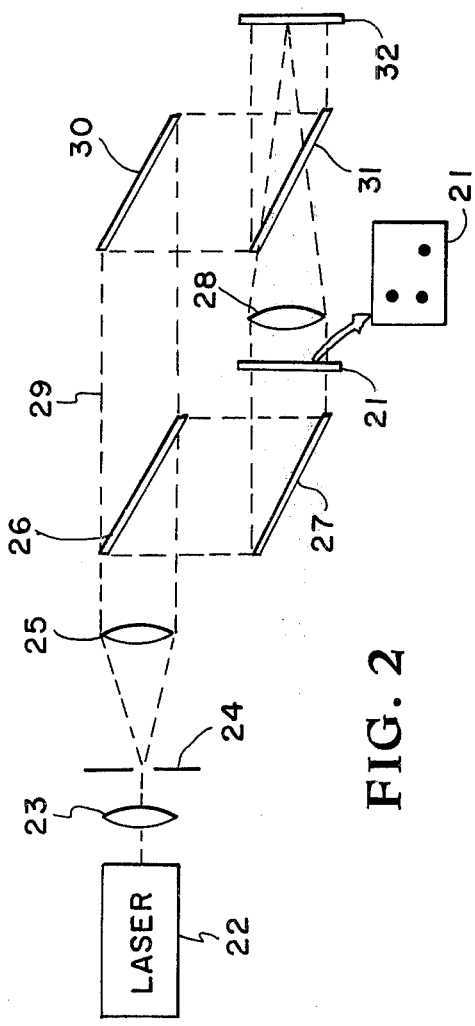
FIG. 3 is a schematic drawing showing how distress locations are detected in the radar images.

A basic search and rescue optical matched filter processor is shown in FIG. 3. In this processor, the detected radar image 33 (containing distressed targets images within a natural background of the scanned area) is illuminated with coherent collimated light in the image plane by means of a low-power milliwatt laser 34, a microscopic lens 35, a pinhole 36 and a collimating lens 37. A lens 38 is used to generate a deflection pattern (Fourier spectrum) of the radar input image at the focal plane 39. The spatial filter 32 which is inserted at this focal plane 39 performs an autocorrelation function for use in identifying a match between any target pattern in the input image and the known or desired target pattern represented by filter 32. The Fourier spectrum of the radar input image is mixed at the focal plane 39 with the filter 32 and a reconstruction lens 40 is used to convert the complex optical signal by a second Fourier transformation to a correlation signal at the output plane 41. The image produced in the output plane 41 is a correlation spot. When the radar input image is matched to filter 32, the correlation spot is sharply focused and its position within the output plane 41 is a linear function of the position of the distressed targets within the radar field-of-view. In this way, the search and rescue target is identified and its location is specified.

The advantages of this invention are: global search capability; day or night and all-weather operation; user initiation of distress condition; reliable passive user equipment having extensive useful life in an emergency environment; low user cost for equipment; image data available with distress site location data to structure rescue operations; and short time lapse detecting capability.

What is claimed is:
1. A method for locating any person in distress on a part of the surface of the earth who has deployed passive RF reflectors in a predetermined arrangement to indicate his distress situation comprising the steps of:
    making a first transparency in the spatial frequency domain of an image of said RF reflectors in said predetermined arrangement;
    scanning said part of the surface of the earth with a side-looking radar to produce images of said part of the surface of the earth;
    making second transparencies in the conventional image domain of said images produced by said radar; and
    determining, from said first and second transparencies by complex spatial filtering, if said RF reflectors in said predetermined arrangement were deployed on said part of the surface of the earth when scanned by said radar.

2. A method according to claim 1 wherein said step of making a first transparency includes the steps of:
    making a transparency on which the images of said predetermined arrangement of passive reflectors are stored in the conventional image domain;
    illuminating said transparency with coherent collimated light;
    forming a reference beam of said coherent collimated light;
    mixing the light passed through said transparency with said reference beam and transforming said mixed light into a Fourier spectrum; and
    focusing said Fourier spectrum onto a film to form said first transparency.

3. A method according to claim 1 wherein said step for determining, from first and second transparencies by complex spatial filtering, if said RF reflectors in said predetermined arrangement were deployed on said part of the surface of the earth when scanned by said radar includes the steps of:
    illuminating said second transparencies with coherent collimated light;
    transforming the light passed through said second transparencies into a Fourier spectrum and focusing it onto said first transparency thereby mixing the Fourier spectrums of the radar input images with the image of the predetermined arrangement of passive reflectors;
    transforming via a Fourier transformation the complex optical signal passed through said first transparency into a correlation signal; and
    producing from said correlation signal an image which is a correlation spot that is sharply focused when the radar input image is matched to the images on said first transparency and the position of the correlation spot within the output plane is a linear function of the position of the distress target within the radar field-of-view.

4. A method of determining if a predetermined arrangement of passive reflectors were scanned by a radar used in a search operation comprising the steps of:

- making a first transparency on which the images of said predetermined arrangement of passive reflectors are stored in the Fourier transform domain;
- making a second transparency on which the images from the field-of-view of said radar are stored in the conventional image domain;
- illuminating said second transparency with coherent collimated light;
- transforming the light passed through said second transparency into a Fourier spectrum and focusing it onto said first transparency thereby mixing the Fourier spectrum of the radar input image with the predetermined arrangement of passive reflectors;
- transforming via a Fourier transformation the complex optical signal passed through said first transparency into a correlation signal; and
- producing from said correlation signal an image which will be a correlation spot that will be sharply focused when the radar input image is matched to the images on said first transparency and the position of the correlation spot within the output plane will be a linear function of the position of the distress target within the radar field-of-view.

* * * * *